United States Patent [19]
Ogata et al.

[11] Patent Number: 5,526,330
[45] Date of Patent: Jun. 11, 1996

[54] OPTICAL HEAD ASSEMBLY FOR OPTICAL INFORMATION PLAYER

[75] Inventors: Daisuke Ogata, Kobe; Shunji Oohara, Higashiosaka, both of Japan

[73] Assignee: Matsushita Electric Industrial Co., Ltd., Osaka-Fu, Japan

[21] Appl. No.: 280,579

[22] Filed: Jul. 25, 1994

Related U.S. Application Data

[63] Continuation of Ser. No. 54,196, Apr. 30, 1993, abandoned.

[30] Foreign Application Priority Data

Dec. 24, 1992 [JP] Japan .................................. 4-343920

[51] Int. Cl.⁶ .................................................. G11B 7/09
[52] U.S. Cl. .................... 369/44.14; 369/112; 369/44.37; 250/201.5
[58] Field of Search .............................. 369/44.37, 44.14, 369/44.26, 112, 44.11; 250/201.5

[56] References Cited

U.S. PATENT DOCUMENTS

| | | | |
|---|---|---|---|
| 4,987,292 | 1/1991 | Howard | 369/44.41 |
| 5,166,506 | 11/1992 | Fiete et al. | 250/201.7 |
| 5,210,730 | 5/1993 | Hayashi et al. | 369/44.37 |

FOREIGN PATENT DOCUMENTS

| | | |
|---|---|---|
| 0393719 | 10/1990 | European Pat. Off. . |
| 0439876 | 8/1991 | European Pat. Off. ............ 369/44.37 |
| 0469552A3 | 2/1992 | European Pat. Off. . |
| 4036615A1 | 5/1991 | Germany . |
| 63-288428 | 11/1988 | Japan . |
| 2-278522 | 11/1990 | Japan . |

*Primary Examiner*—Aristotelis Psitos
*Assistant Examiner*—Duncan Wilkinson
*Attorney, Agent, or Firm*—Wenderoth, Lind & Ponack

[57] ABSTRACT

An optical head assembly for an optical information reading and reproducing apparatus including a laser for emitting a laser beam directed so as to impinge upon an information carrier disc. Rays of light reflected from the information carrier disc is separated into a reproduction signal detecting beam and two servo signal detecting beams by a path separator prism. The reproduction signal detecting beam enters a reproduction signal detector while the servo signal detecting beams enter an image sensor. The image sensor is so positioned as to cause images of the light beams to assume a substantially equal size. By selecting pixels effective to properly detect focusing and tracking errors, various servo signals can be obtained in dependence on outputs from those pixels selected.

12 Claims, 6 Drawing Sheets

Fig. 2(a)
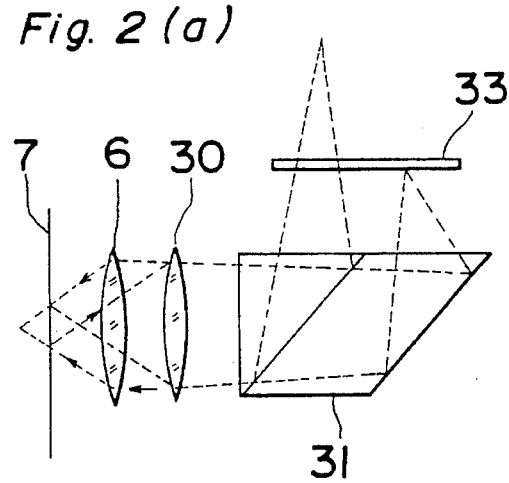
Fig. 2(b)-1
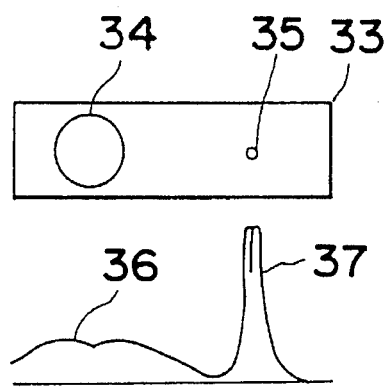
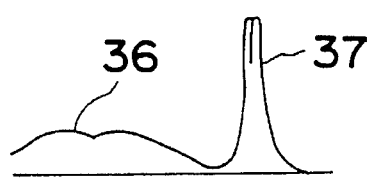
Fig. 2(b)-2
Fig. 3(a)
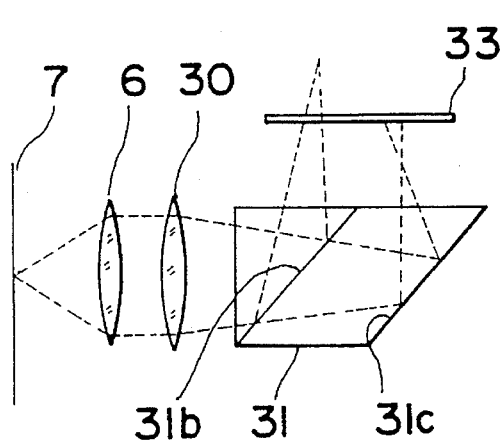
Fig. 3(b)-1
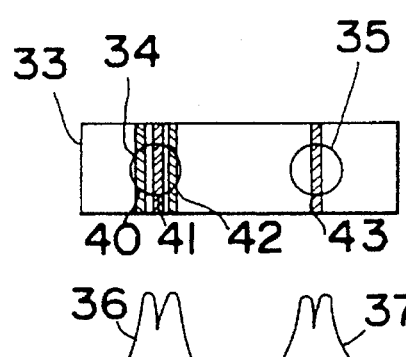
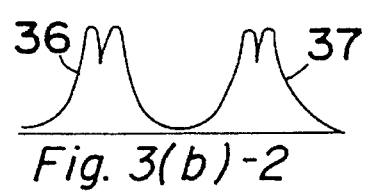
Fig. 3(b)-2
Fig. 4(a)
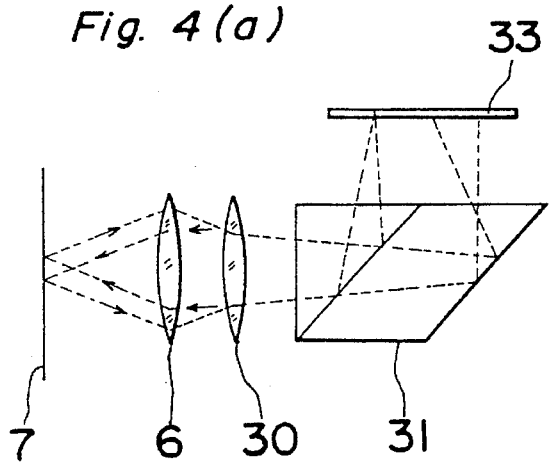
Fig. 4(b)-1
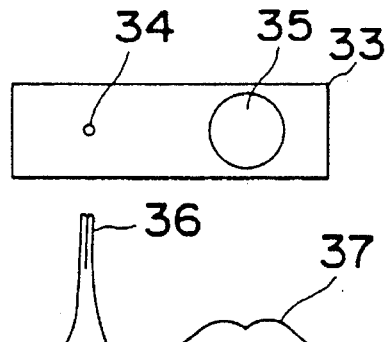
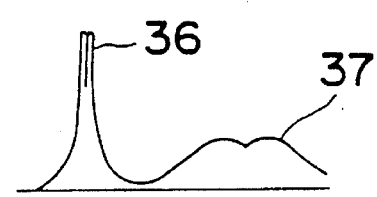
Fig. 4(b)-2

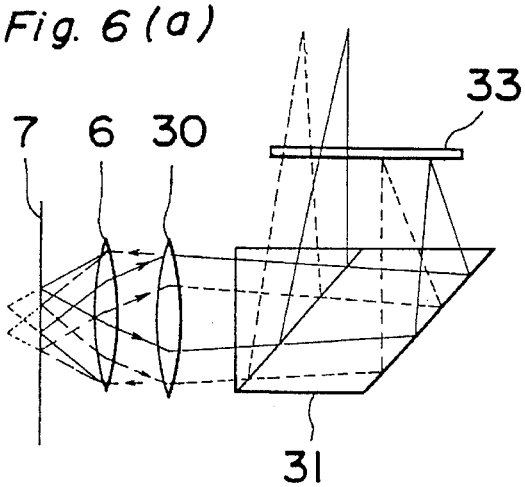
Fig. 6(a)
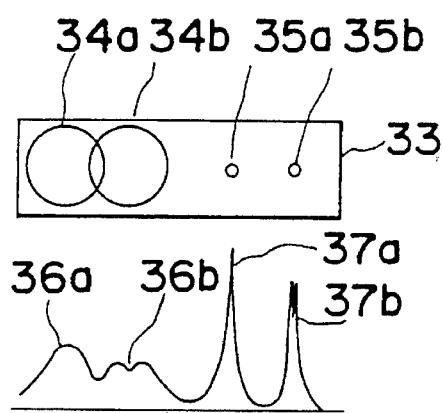
Fig. 6(b)-1
Fig. 6(b)-2
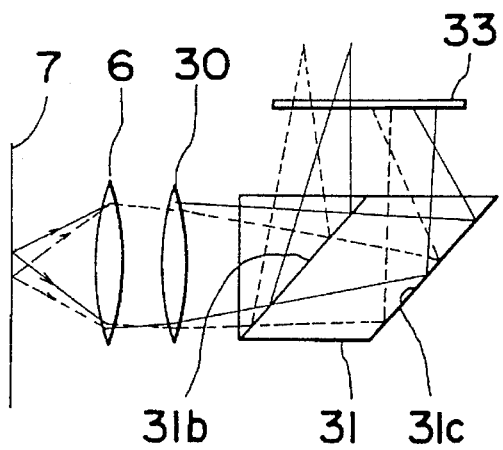
Fig. 7(a)
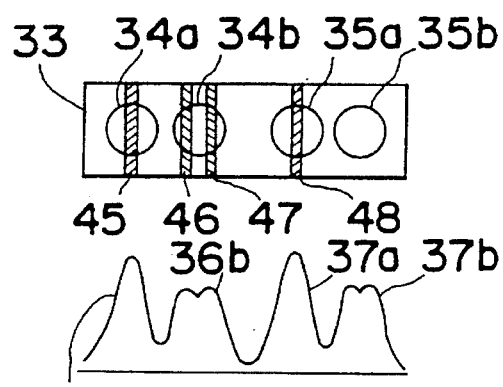
Fig. 7(b)-1
Fig. 7(b)-2
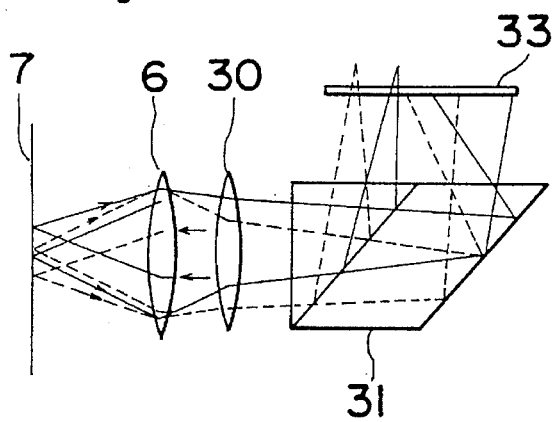
Fig. 8(a)
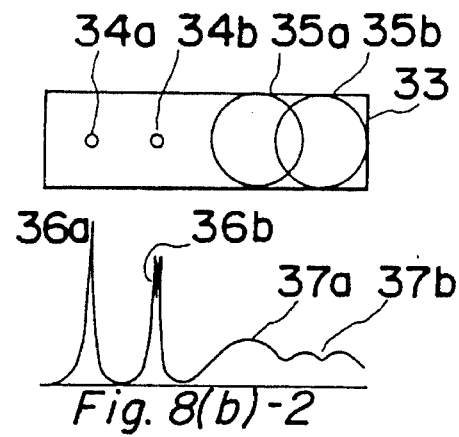
Fig. 8(b)-1
Fig. 8(b)-2

Fig. 9(a)
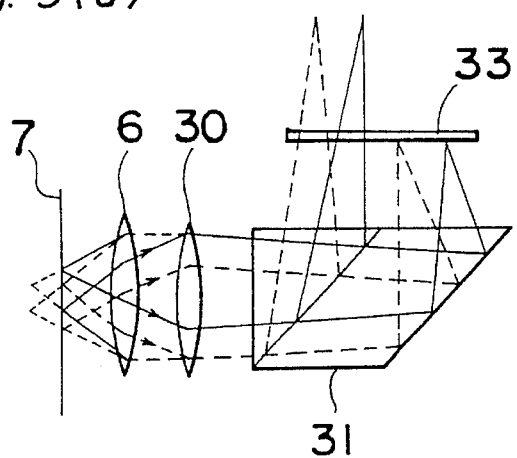
Fig. 9(b)-1
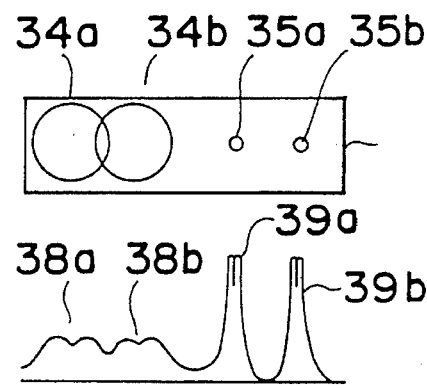
Fig. 9(b)-2
Fig. 10(a)
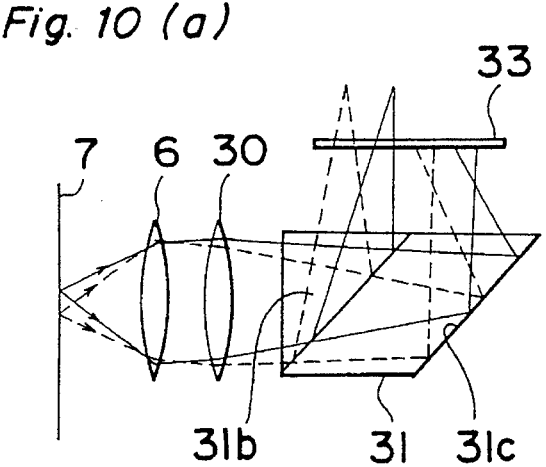
Fig. 10(b)-1
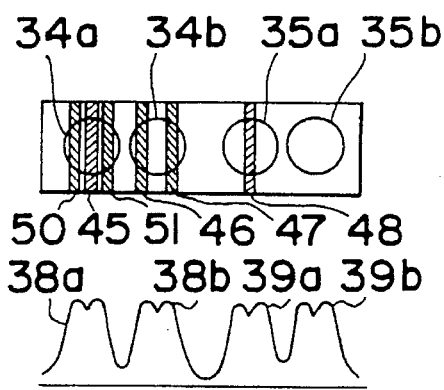
Fig. 10(b)-2
Fig. 11(a)
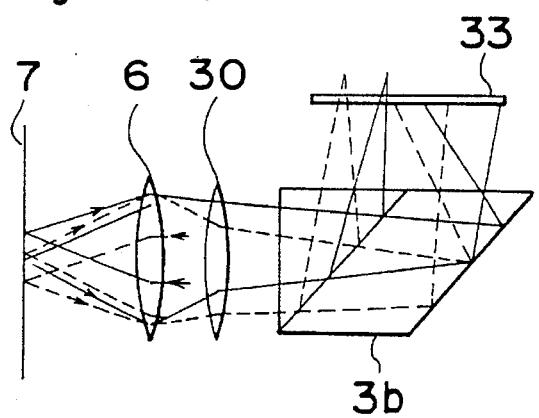
Fig. 11(b)-1
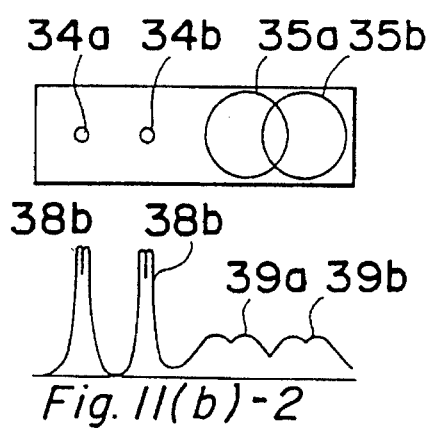
Fig. 11(b)-2

OPTICAL HEAD ASSEMBLY FOR OPTICAL INFORMATION PLAYER

This application is a Rule 62 Continuation of now abandoned application Ser. No. 08/054,196, filed Apr. 30, 1993.

BACKGROUND OF THE INVENTION

1. Field of the Invention

The present invention generally relates to an optical information recording and/or reproducing apparatus for recording or reproducing information on or from an optical recording medium and, more particularly, to an optical head assembly designed to obtain various servo signals and reproduced signals by the utilization of rays of light reflected from the optical recording medium.

2. Description of the Prior Art

In order to achieve high-density information recording or reproduction, an optical recording medium, for example, an optical information carrier disc for use with standard optical recording and/or reproducing apparatus, generally contains a spiral or concentric track having a number of track segments of a width not greater than 1 μm and a pitch of 1 to 2 μm. Information recorded on the optical information carrier disc is read therefrom by radiating a beam of light, controlled to a spot diameter of about 1 μm, and then by processing rays of light reflected from the information carrier disc.

The optical information recording and/or reproducing apparatus utilizing the optical information carrier disc of the type referred to above requires at least two servo systems. One servo system is known as a focusing servo system operable to cause the optical head assembly to compensate for a fluttering motion of the information carrier disc in a direction generally perpendicular to the plane of rotation thereof so that the beam spot can be faithfully projected onto the information carrier disc. The other servo system is known as a tracking servo system operable to cause the optical head assembly to compensate for a lateral displacement of the information track in a direction radially thereof such as resulting from an eccentricity of the information carrier disc relative to the axis of rotation thereof so that the beam spot can faithfully pursue the information track.

In general, the servo signal for focusing servo purposes is available by detecting a change in position and/or size of the beam section which would occur when the light beam is defocused. On the other hand, the tracking signal for tracking servo purpose is available by detecting a change in the distribution of the intensity of light reflected from the information carrier disc when the beam spot deviates from the information track on the information carrier disc.

As a means hitherto utilized therefor, use has generally been made of a photodiode having two or more divided sensing areas so that respective amounts of light received by those sensing areas can be compared with each other. In such a case, the position of the photodiode must be properly adjusted so that the center of the beam spot falling on the photodiode when neither focusing error nor tracking error occur may exactly align with the line of division separating the sensing areas from each other. Considering that the photodiode generally employed in the standard optical head assembly has a light receiving area of about 1 mm, with the line of division being about 10 μm, and that the optical head assembly must be adjusted precisely in a range of distance comparable to the thickness of the line of division, the adjustment in position of the optical head assembly is very time-consuming and requires skill.

On the other hand, in the case of a multi-beam head assembly of a type wherein a plurality of laser beams are employed for simultaneous recording and/or reproduction of information on and from plural information tracks, respective points of emission of laser beams from associated multi-beam semiconductor lasers forming a light source are spaced a distance of about several tens of micrometers, with respective axes of the laser beams closely adjoining each other, the use of the conventional method of detecting the amount of all of the light beams by means of the photodiode poses a problem, in that respective spots of the laser beams may overlap with each other on the light receiving area, resulting in a reduction in quality of the signal due to a mix-up of the adjoining laser beams. In order to avoid this, it is necessary to increase the distance of separation between the beams to thereby avoid any possible overlap thereof on the photodiode and, hence, to increase the focal length of a lens used to converge the beams, resulting in an increase in dimension of the head assembly.

SUMMARY OF THE INVENTION

The present invention has been devised with a view to substantially eliminating the above discussed problems and is intended to provide an improved optical head assembly that is easy to adjust and compact in size even in the case where multiple beams are employed.

To this end, the present invention is featured in that an image sensor is employed for the detection of tracking and focusing errors.

As is well known to those skilled in the art, an image sensor generally employed in a copying machine and a facsimile machine is an integrated detector wherein a plurality of photodiodes or pixels of a generally rectangular shape having one side ranging from 10 to several tens of micrometers are arrayed. When this image sensor, fitted to an optical head assembly, receives rays of light reflected from the information carrier disc, some of the pixels of the image sensor on which the rays of light have fallen output respective amounts of light. Since for the detection of the tracking and focusing servo signals, no total amount of the reflected rays of light need be detected, if some of the pixels, which are located at respective positions appropriate for the signal detection, are selected and respective signals outputted from such some of the pixels are utilized, it is possible to detect the tracking and focusing servo signals. Since each of the pixels has a size comparable to the accuracy within which the conventional photodiode having the divided sensing areas is adjusted in position and, also, since the respective positions of the pixels that are used for the signal detection can be selected electrically, the position of the image sensor relative to the incoming beam need not be adjusted so precisely as required in the prior art assembly in which the photodiode having the divided sensing areas is employed, rendering the adjustment job very simplified.

Also, even though the plural beams closely adjoin each other in the case of the multi-beam head assembly, interference between the adjoining beams can be reduced to a negligible value by selecting some of the pixels which are positioned at respective locations where the intensities of light of the adjoining beams are sufficiently low. Accordingly, the need to increase the focal length of the converging lens is eliminated and the size of the head assembly can be made comparable to that in which a single beam is employed.

While the photodiode hitherto employed as a detector could have been able to continuously output a signal, the image sensor has a sweep cycle during which the pixels forming the image sensor successively generate respective outputs. Although the image sensor of a type wherein about 200 nanoseconds is required for each pixel to complete a signal output has already been employed in practice, since the number of the pixels in the image sensor generally used in other applications is about 1,000, the charge sweep-out time of about 200 microseconds is required for all of the pixels to complete the signal output. Accordingly, an output from one of the pixels is held during a period in which the other pixels are outputting and, therefore, respective outputs from all those pixels are available discontinuously. In the optical head assembly, since the cycle of an error detection signal required by the servo system is about 10 to about 30 microseconds, and if the image sensor having a charge sweep-out time encompassing the cycle of the error detection signal is employed, the cycle of the servo signals necessary for focusing and tracking controls can be attained with no problem. By way of example, in the case where the outputting of the signal from one pixel takes about 200 nanoseconds, use is recommended of the image sensor including about 50 to about 150 pixels.

BRIEF DESCRIPTION OF THE DRAWINGS

The above and other objects and features of the present invention will become clear from the following description, taken in conjunction with preferred embodiments thereof and with reference to the accompanying drawings, in which like parts are designated by like reference numerals, and in which:

FIG. 2(a) is a schematic representation of the optical head assembly of FIG. 1, showing an aft-focused condition of an objective lens employed in the optical head assembly;

FIGS. 2(b) are a schematic diagram showing respective amounts of light received by an image sensor employed in the optical head assembly during the aft-focused condition;

FIG. 3(a) is a schematic representation of the optical head assembly of FIG. 1, showing an in-focused condition of the objective lens;

FIG. 3(b) are schematic diagram showing respective amounts of light received by the image sensor employed in the optical head assembly during the in-focused condition;

FIG. 4(a) is a schematic representation of the optical head assembly of FIG. 1, showing a fore-focused condition of the objective lens;

FIG. 4(b) are schematic diagram showing respective amounts of light received by an image sensor employed in the optical head assembly during the fore-focused condition;

FIGS. 6(a) and 6(b) are views similar to FIGS. 2(a) and 2(b), respectively, but pertaining to the second embodiment of the present invention;

FIGS. 7(a) and 7(b) are views similar to FIGS. 3(a) and 3(b), respectively, but pertaining to the second embodiment of the present invention;

FIGS. 8(a) and 8(b) are views similar to FIGS. 4(a) and 4(b), respectively, but pertaining to the second embodiment of the present invention;

FIGS. 9(a) and 9(b) are views similar to FIGS. 2(a) and 2(b), respectively, but pertaining to a third embodiment of the present invention;

FIGS. 10(a) and 10(b) are views similar to FIGS. 3(a) and 3(b), respectively, but pertaining to the third embodiment of the present invention;

FIGS. 11(a) and 11(b) are views similar to FIGS. 4(a) and 4(b), respectively, but pertaining to the third embodiment of the present invention;

DETAILED DESCRIPTION OF THE EMBODIMENTS

Figure 1:
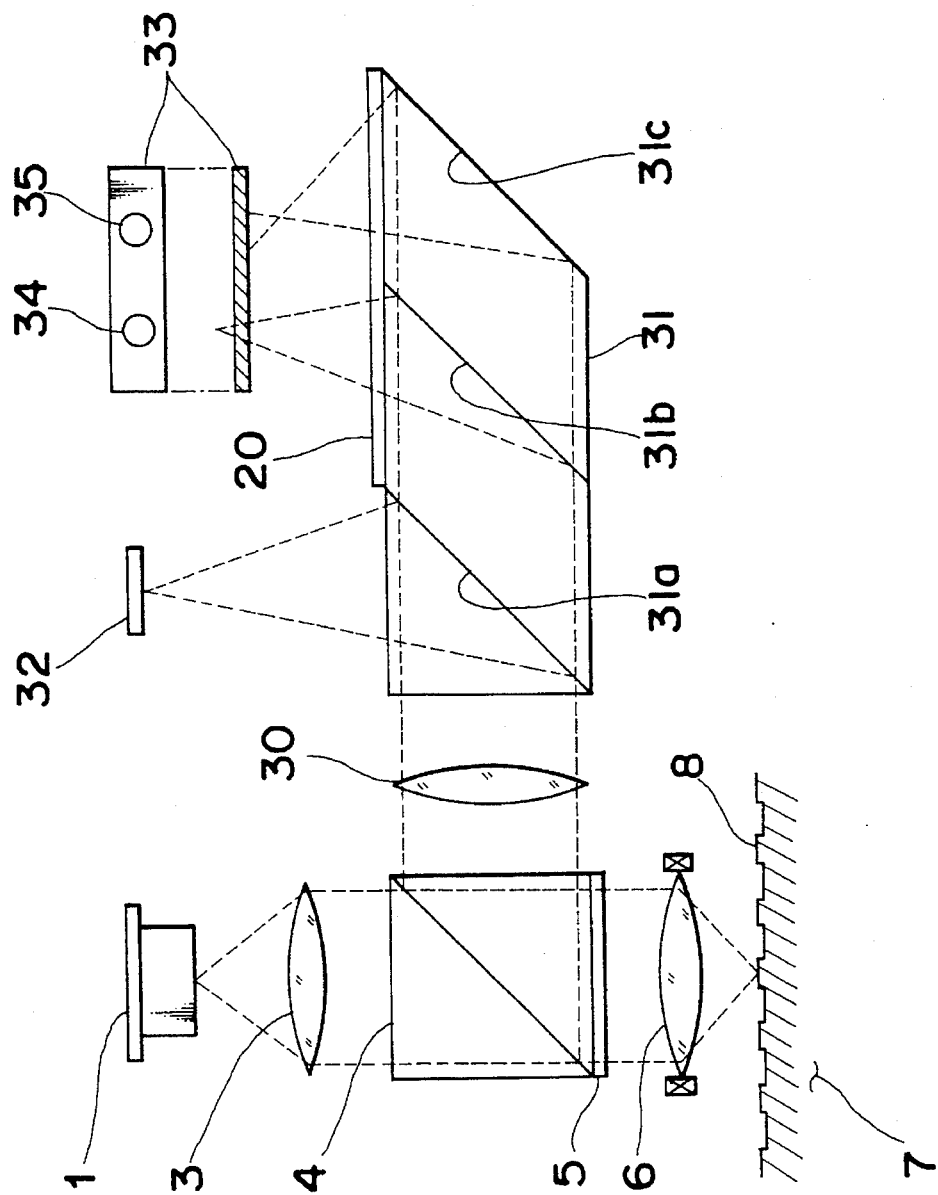
FIG. 1 is a schematic diagram showing an optical head assembly according to a first embodiment of the present invention.

Referring first to FIG. 1, an optical system shown therein comprises a beam transmission means including a light source 1 which may be, for example, a semiconductor laser, a collimator lens 3 for collimating rays of light emitted from the semiconductor laser 1, a polarizing beam splitter 4 for selectively deflecting or passing therethrough the collimated rays of light depending on the direction of polarization of the laser beam, a quarter wavelength plate 5, and an objective lens 6 for condensing the laser beam into a tiny beam spot. Positioned on one side of the objective lens 6 opposite to the beam splitter 4 is an information carrier disc 7 having a guide groove 8 which, when the laser beam is projected onto the guide groove 8, reflect the laser beam back towards the quarter wavelength plate 5.

The reflected laser beam passes again through the quarter wavelength plate 5 with its direction of polarization altered and, after having been deflected by the beam splitter 4, travels towards a path separator prism 31 through a condenser lens 30. The laser beam entering the path separator prism 31 is for the most part reflected by a reflecting surface 31a so as to enter a detector 32 so that an RF signal of information recorded on a track may be outputted from the detector 32.

The laser beam having passed through the first reflecting surface 31a is subsequently divided into two beam components of equal light intensity, one being reflected thereby towards an image sensor 33 and the other being passed towards a third reflecting surface 31c, which totally reflects the beam component towards the image sensor 33. Both of the beam components reflected by the second reflecting surface 31b and by the third reflecting surface 31c enter the image sensor 33 through a light reducing filter 20 so as to form respective images 34 and 35 thereon. The light reducing filter 20 serves to attenuate the incoming light when the density of light energies exceeds the allowance of the image sensor 33.

The image sensor 33 used therein is of a type having a charge sweep-out time that satisfies the value required by the servo systems. A commercially available image sensor manufactured and sold under "TCD104D" from Toshiba Corp. of Japan may be employed therefor, which includes 148 pixels and has a charge sweep-out time of 30 microseconds.

The beam component reflected by the third reflecting surface 31c is converged at a point spaced a distance equal to the distance between the second and third reflecting surfaces 31b and 31c inwardly from the point at which the beam component reflected by the second reflecting surface 31b is converged. The image sensor 33 is so positioned relative to the second and third reflecting surfaces 31b and 31c as to allow the images 34 and 35 to be projected on the image sensor 33 in an equal size.

The principle of detection of focusing and tracking servo signals will now be discussed with particular reference to FIGS. 2 to 4. It is to be noted that in each of FIGS. 2(a), 3(a) and 4(a), the optical system shown in FIG. 1 is shown schematically for the purpose of brevity.

FIG. 2(a) illustrates the condition in which the distance between the objective lens 6 and the surface of the information carrier disc 7 is smaller than a desired distance; FIG. 3(a) illustrates the condition in which the distance between the objective lens 6 and the surface of the information carrier disc 7 is equal to the desired distance (an in-focused condition); and FIG. 4(a) illustrates the condition in which the distance between the objective lens 6 and the surface of the information carrier disc 7 is greater than the desired distance.

FIGS. 2(b), 3(b) and 4(b) illustrates how imagewise rays of light are cast upon the image sensor 33 to form the corresponding images 34 and 35 during the associated conditions of FIGS. 2(a), 3(a) and 4(a), respectively. Reference numerals 36 and 37 used in FIGS. 2(b), 3(b) and 4(b) represent respective shapes of patterns of distribution of light intensities corresponding to the images 34 and 35. While the pattern of distribution of any of the imagewise rays of light 36 and 37 is in practice represented by a curve having a single peak, the pattern of distribution thereof is conveniently shown in the form of a curve having two peaks for the purpose of illustrating the imagewise rays of light 36 and 37 having been affected by a diffraction of the beam that takes place when the beam impinging upon the guide groove 8 is reflected by the information carrier disc 7.

Respective positions of the peaks represent respective positions to which, when the center of the beam deviates from the center of the guide groove 8, the pattern of distribution varies under the influence of the diffraction.

In the condition shown in FIGS. 3(a) and 3(b), since the image sensor 33 is so positioned as described hereinbefore, the respective shapes of the patterns of distribution of the light intensities 36 and 37 are substantially similar to each other and, accordingly, the amounts of light received by the pixels 41 and 43 held in position corresponding to the patterns 36 and 37 are substantially equal to each other. However, in the case of the condition shown in FIGS. 2(a) and 2(b), the point at which each of the beams reflected by the reflecting surfaces 31b and 31c , respectively, is converged is displaced downstream with respect to the direction of travel of light as compared with that during the condition of FIG. 3(a). The pattern of distribution of the light intensity 36 detected by the image sensor 33 represents a peak of a shape widely flaring downwardly while the pattern of distribution of the light intensity 37 represents a higher peak of a shape narrowly flaring downwardly. Accordingly, the amount of flight received by the pixel 41 is smaller than that received by the pixel 43.

Conversely, in the case of the condition shown in FIGS. 4(a) and 4(b), since the peak of the pattern of distribution of the light intensity 36 is low while the pattern of distribution of the light intensity 37 is high, the amount of light received by the pixel 41 is greater than that received by the pixel 43. Accordingly, by providing a difference in output between the pixels 41 and 43, the focusing servo signal can be detected.

In the condition shown in FIGS. 3(a) and 3(b), although where no tracking error exist, the pixels 40 and 42 held at respective positions corresponding to two peaks of the pattern of distribution of the light intensity 36 receive a substantially equal amount of light, a difference will occur between the respective amounts of light received by the pixels 40 and 42 according to the principle of the well-known push-pull method in the event of an occurrence of an off-tracking. Accordingly, by providing a difference in output between the pixels 40 and 42, the tracking servo signal can be detected.

In the event of an occurrence of a defocused condition, the shape of the downwardly extending flare of any of the patterns of distribution of the light intensities 36 and 37 varies and, therefore, respective positions of the two peaks in the pattern 36 deviate from the pixels 40 and 42. However, in the case where the optical head is driven in a usual manner, since the focusing control takes place prior to the tracking control, an in-focus condition is already attained at the time of detection of the tracking error and, therefore, the pattern of distribution of the light intensity is always of a shape as shown by the pattern 36. Accordingly, a change in height of the peak of the pattern 36 generated during the off-tracking can stably be detected by the pixels 40 and 42 at all times.

Figure 5:
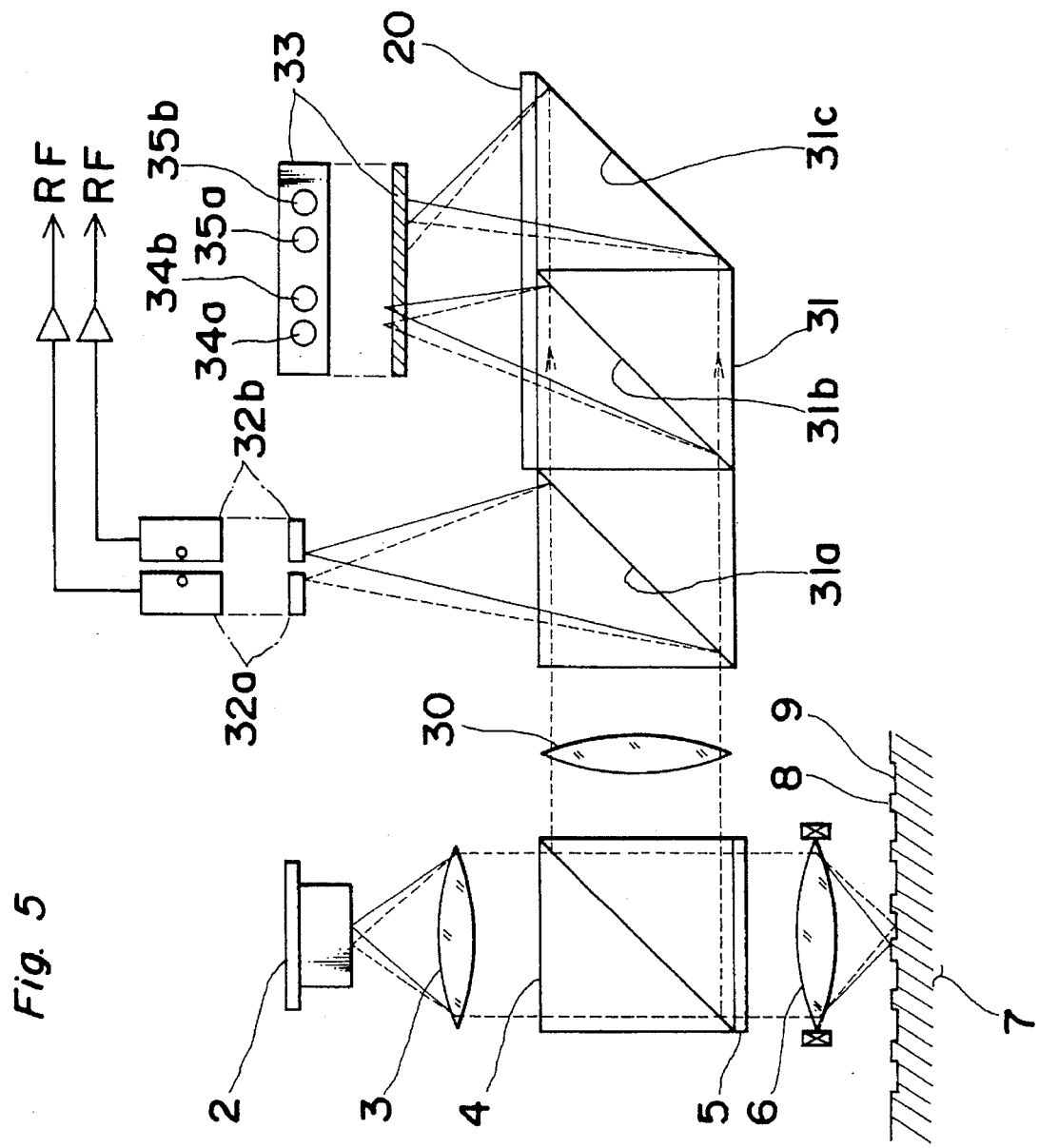
FIG. 5 is a schematic diagram showing the optical head assembly according to a second embodiment of the present invention.

FIG. 5 illustrates the structure of a two-beam optical head assembly according to another embodiment of the present invention. In FIG. 5, parts similar to those shown in FIGS. 1 to 4 are designated by like reference numerals.

Referring now to FIG. 5, reference numeral 2 represents a semiconductor laser capable of emitting two laser beams, and reference numerals 8 and 9 represent a guide groove 8 and a flat area 9 both on the information carrier disc 7. One of the laser beams emitted from the semiconductor laser 1 is adapted to be converged at the guide groove 8 while the other of the laser beams is adapted to be converged at the flat area 9, thereby accomplishing recording of information. Rays of light reflected from the information carrier disc 7 pass again through the quarter wavelength plate 5 and are, after having been deflected and subsequently reflected by the splitter 4, passed to the path separator means 31 through a condenser lens 30, the path separator means 31 being operable to separate the incoming rays of light.

A beam component reflected by the first reflecting surface 31a of the path separator means 31 impinges upon two-division detectors 32a and 32b so that the latter subsequently output respective RF signals indicative of track information read out from the flat area 9 and the guide groove 8. Another beam component having transmitted through the first reflecting surface 31a subsequently travels to the second reflecting surface 31b , by which it is divided into reflected and transmitted light components of substantially equal light intensity, the transmitted light component being subsequently totally reflected by the third reflecting surface 31c.

The rays of light reflected by the second and third reflecting surfaces 31b and 31c are subsequently projected onto the image sensor 33 to form images 34a, 34b and 35a, 35b thereon. The rays of light reflected by the third reflecting surface 31c are converged at a point spaced a distance equal to the distance between the second and third reflecting surfaces 31b and 31c inwardly from the point at which the beam component reflected by the second reflecting surface 31b is converged. The image sensor 33 is so positioned that at such points of convergence of the rays of light reflected respectively by the second and third reflecting surfaces 31b and 31c, the images 34a and 35b can assume a substantially equal size.

Each of FIGS. 6(a), 7(a) and 8(a) show the optical system shown in FIG. 3 schematically for the purpose of illustration of the principle of detection of focusing and tracking servo signals.

FIG. 6(a) illustrates the condition in which the distance between the objective lens 6 and the surface of the information carrier disc 7 is smaller than a desired distance; FIG. 7(a) illustrates the condition in which the distance between the objective lens 6 and the surface of the information carrier disc 7 is equal to the desired distance (an in-focused condition); and FIG. 8(a) illustrates the condition in which the distance between the objective lens 6 and the surface of the information carrier disc 7 is greater than the desired distance.

FIGS. 6(b), 7(b) and 8(b) illustrate how imagewise rays of light are cast upon the image sensor 33 to form the corresponding images during the associated conditions of FIGS. 6(a), 7(a) and 8(a), respectively. Reference numerals 36a, 36b, 37a and 37b used in FIGS. 6(b), 7(b) and 8(b) represent respective patterns of distribution of light intensities corresponding to images 34a, 34b, 35a and 35b formed on the image sensor 33. As is the case with those shown in FIGS. 2 to 4, two peaks of the pattern of distribution of any of the distribution patterns 36b and 37b are conveniently illustrated only for the purpose of showing that the imagewise rays of light have been affected by a diffraction of the beam that takes place when the beam impinging upon the guide groove 8 is reflected by the information carrier disc 7.

The principle of detection of the servo signal is similar to that shown in FIGS. 2 to 4 and, thus, the servo signal is detected by the utilization of respective outputs from some pixels corresponding in position to the peaks of the distribution pattern. Specifically, the servo signal is detected in dependence on the difference in output between the pixels 45 and 48 and the tracking servo signal is detected in dependence on the difference in output between the pixels 46 and 47.

It is to be noted that, although in the illustrated embodiment reference has been made to the combination shown in FIGS. 6 to 8 as examples of pixels utilized to detect the servo signal, a different combination is possible, since the pixels of the image sensor 33 are arbitrarily selectable as desired. By way of example, referring to FIG. 5, where the information carrier disc 7 having the guide groove 8 and the flat area 9, both being of a width in the order of about 1 µm, is employed, reflected by both the light reflected by the guide groove 8 and that reflected by the flat area 9 represent a pattern of distribution of light which has been affected by diffraction and; therefore, such a selection of pixels as shown in FIGS. 9 to 11 is possible.

While FIGS. 9 to 11 are substantially similar to FIGS. 6 to 8, arrangement has been made that the tracking servo signal can be detected from the pixels 50 and 51 in reference to a light spot 34a which is, in the case of the system represented by FIGS. 6 to 8, not utilized for the detection of the tracking servo signal. In the case of the system represented by FIGS. 6 to 8, the tracking control is carried out relying only on the light spot 34b, and therefore the light spot 34a does not completely pursue the track, but tracking control is possible with the utilization of the tracking servo signal obtained from the pixels 50 and 51 if a tracking mechanism dedicated for the light spot 34a in the case of the system represented by FIGS. 9 to 11, thus making it possible to cause the light spot 34a to follow the track as is the case with the light spot 35b.

Figure 12:
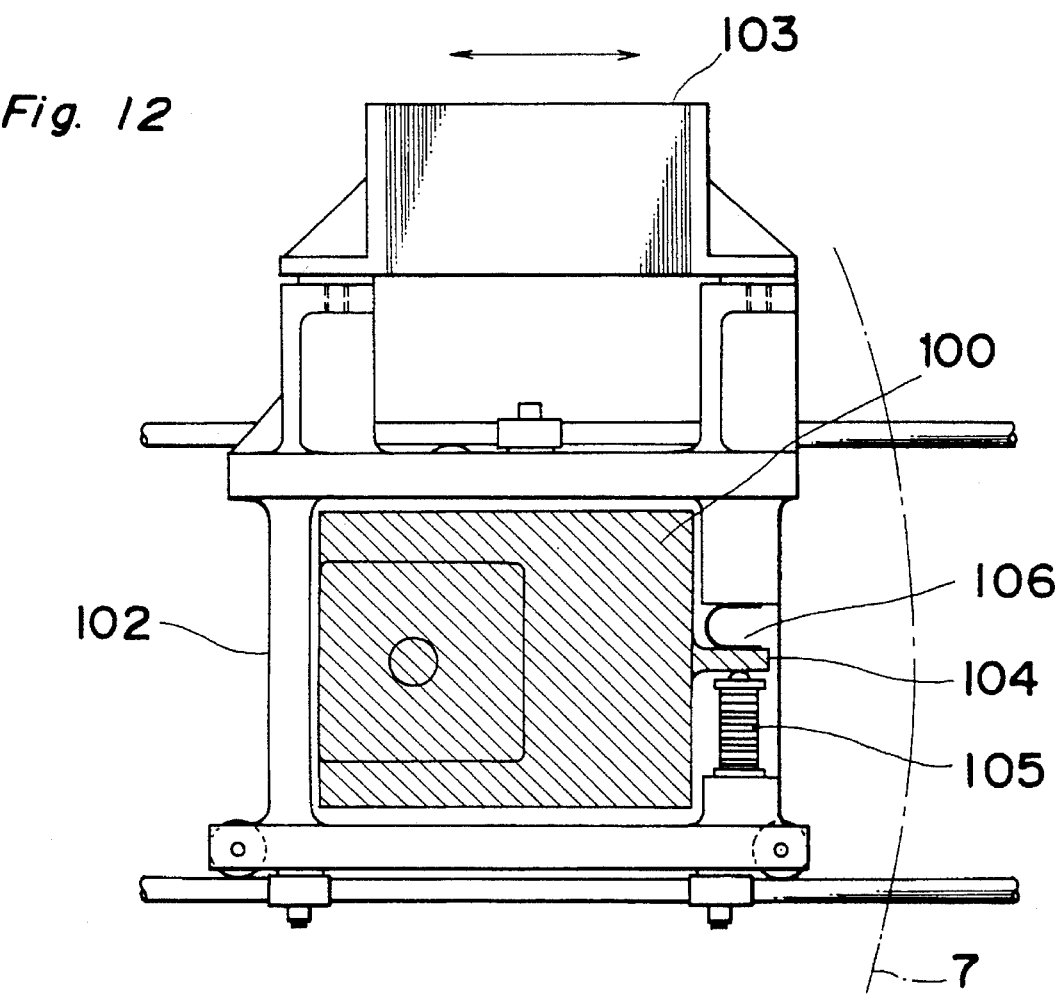
FIG. 12 is a top plan view showing the optical head assembly operable on the principle shown in FIGS. 9 to 11.
Figure 13:
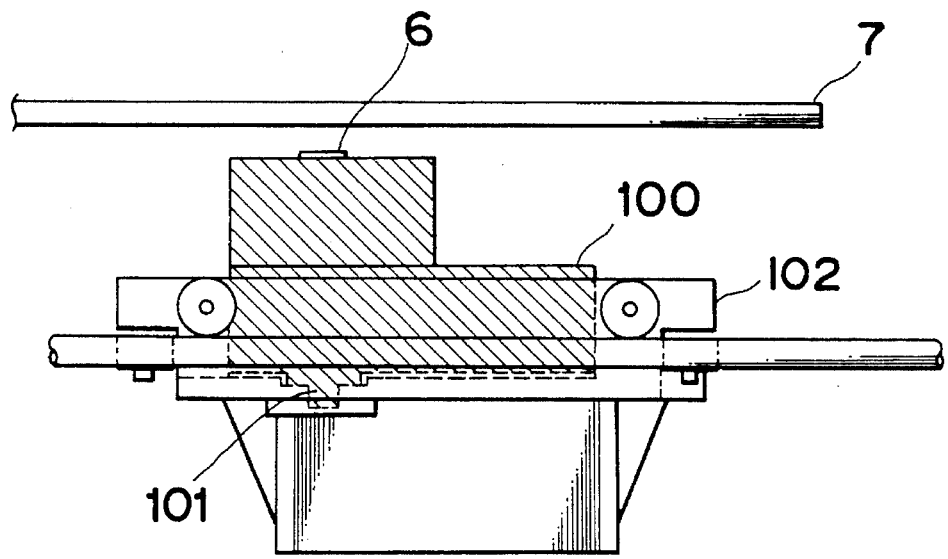
FIG. 13 is a side view of the optical head assembly shown in FIG. 12.

FIGS. 12 and 13 illustrate an embodiment employed when the tracking control is carried out subject to both of the two light spots. Referring to FIGS. 12 and 13, an optical head assembly 100 represented by a shaded area has its bottom provided with a rotary shaft 101 coaxial with an extension of an optical axis of the objective lens 6 and is supported by a support frame 102 through the rotary shaft 101. The support frame 102 has a transport mechanism 103 mounted thereon so that the optical head assembly 100 can be moved in a direction radially of the information carrier disc 7. Both a leaf spring 106 and a piezoelectric element 105 are disposed between a projection 104, protruding outwardly from the optical head assembly 100, and the support frame 102 such that an expansion of the piezoelectric element 105 results in a rotation of the optical head assembly 100 about the rotary shaft 101. The leaf spring 106 is employed for preloading the piezoelectric element 105. At this time, the direction of orientation of the two light spots formed on the information carrier disc 7 is rotated about the optical axis of the objective lens in dependence on the amount of expansion of the piezoelectric element 105. The tracking control of the light spot on the guide groove 8 is carried out in a manner similar to that shown in FIGS. 4 to 8, but the tracking control of the light spots on the flat area 9 is carried out by appropriately expanding a suitable amount the piezoelectric element 105 in response to the servo signal obtained according to the method shown in FIGS. 9 to 11.

If in any one of the foregoing embodiments of the present invention, the servo systems are so designed that the focusing servo signal and the tracking servo signals become zero, the servo of both of the focusing and the tracking can be realized.

Although the present invention has been described in connection with the preferred embodiments thereof with reference to the accompanying drawings, it is to be noted that various changes and modifications are apparent to those skilled in the art. For example, although reference has been made to the two-beam optical head assembly, the present invention can be equally applied to a three-beam or more beam optical head assembly. Such changes and modifications are to be understood as included within the scope of the present invention as defined by the appended claims, unless they depart therefrom.

What is claimed is:

1. An optical head assembly, comprising:

a light source for emitting at least one laser beam;

beam transmission apparatus for transmitting the laser beam from said light source and converging the laser beam on a recording medium;

at least one lens for forming an image with rays of light reflected from the recording medium;

a beam separating means disposed on an optical path that extends from the point where the image is formed for dividing the rays of light reflected from the recording medium into a first light component for detection of an information reproduction signal and a second light component other than said first light component, and also for dividing the second light component into substantially equal light beams and causing said substantially equal light beams to form respective images at different positions that do not lie in the same plane and are not on the same path;

a detector for detecting the amount of the first light component separated by said beam separating means; and an image sensor disposed at a location substantially intermediate between said different positions at which said images of said substantially equal light beams are formed and along respective paths of travel of said substantially equal light beams, said image sensor comprising an array of at least 50 rectangular pixels, operable to sequentially output an electric signal proportional to the amount of light received by each of said pixels.

2. An optical head assembly, comprising:

a light source for emitting at least one laser beam;

beam transmission apparatus for transmitting the laser beam from said light source and converging the laser beam on a recording medium;

at least one lens for forming an image with rays of light reflected from the recording medium;

a beam separating means disposed on an optical path that extends from the point where the image is formed, said beam separating means comprising first, second and third reflecting surfaces, said first reflecting surface being operable to divide most of the light intensity of the rays of reflected light, and said second and third reflecting surfaces being operable to divide the rays of reflected light that have passed through the first reflecting surface into substantially equal light beams that form respective images at different positions that do not lie in the same plane and are not on the same path;

a detector for detecting the amount of the rays of light reflected by said first reflecting surface; and an image sensor disposed at a location substantially intermediate between said different positions at which said images of said substantially equal light beams are formed and along respective paths of travel of said substantially equal light beams for detecting respective amounts of said substantially equal light beams, said image sensor comprising an array of at least 50 rectangular pixels, operable to sequentially output an electric signal proportional to the amount of light received by each of said pixels.

3. The optical head assembly of claim 2, wherein said image sensor defines a means for obtaining a focusing servo signal from the difference in output from respective said pixels that are positioned substantially in alignment with respective centers of said images formed by the rays of light reflected by said second and third reflecting surfaces, and for obtaining a tracking servo signal from the difference in output from some of said pixels at two locations in one of the substantially equal light beams, the two locations corresponding to points in the one beam where the distribution of light intensity in the one beam is most affected by diffraction due to a guide groove.

4. The optical head assembly of claim 2, wherein said light source emits first and second laser beams and said beam transmission apparatus transmits the first and second laser beams from said light source towards the recording medium for simultaneously recording or reproducing information on or from a plurality of information tracks on the recording medium.

5. The optical head assembly of claim 4, wherein said beam separating means divides the rays of reflected light from both the first and second laser beams such that first and second light beams are reflected by said second reflecting surface and third and fourth light beams are reflected by said third reflecting surface, and wherein said image sensor defines a means for obtaining a focusing servo signal from a difference in output from different said pixels of said image sensor held at respective positions on said image sensor corresponding to maximized distributions of light of the first and third light beams and for obtaining a tracking servo signal from a difference in output from different said pixels of said image sensor at two locations at which the distribution of the light intensity of one of the second and the fourth light beams is most affected by diffraction due to a guide groove, when the first and third light beams are reflected from a flat area of the recording medium and the second and fourth light beams are reflected from a guide groove of the recording medium.

6. The optical head assembly of claim 4, wherein the recording medium has a guide groove and a flat area which have substantially the same width, said beam separating means divides the rays of reflected light from both the first and second laser beams such that first and second light beams are reflected by said second reflecting surface and third and fourth light beams are reflected by said third reflecting surface, and wherein said image sensor defines a means for obtaining, if the first and third light beams are reflected from the flat area of the recording medium while the second and fourth light beams are reflected from the guide groove of the recording medium, a focusing servo signal from the difference in output from respective said pixels that are positioned corresponding to the respective positions of the centers of the images formed by the first and third light beams, a tracking servo signal for the light reflected from the flat area from the difference in output from some of said pixels at two locations in the second light beam, the two locations corresponding to points in the second light beam where the distribution of light intensity is most affected by diffraction due to a guide groove, and a tracking servo signal for the light reflected from the guide groove from the difference in output from some of said pixels at two locations in the fourth light beam, the two locations corresponding to points in the fourth light beam where the distribution of light intensity of the fourth light beam is most affected by diffraction due to the guide groove.

7. An optical head assembly, comprising:

a light source for emitting at least one laser beam;

beam transmission apparatus for transmitting the laser beam from said light source and converging the laser beam on a recording medium;

at least one lens for forming an image with rays of light reflected from the recording medium;

a beam separator comprising first, second and third reflecting surfaces, said first reflecting surface being operable to divide most of the light intensity of the rays of reflected light, and said second and third reflecting surfaces being operable to divide the rays of reflected light that have passed through the first reflecting surface into substantially equal light beams that form images at different positions that do not lie in the same plane and are not on the same path;

a detector for detecting the amount of the first light component separated by said beam separator; and an image sensor disposed at a location substantially intermediate between said different positions at which said images of said substantially equal light beams are formed and along respective paths of travel of said substantially equal light beams for detecting respective amounts of said substantially equal light beams, said image sensor comprising an array of pixels operable to sequentially output an electric signal proportional to the amount of light received thereby;

wherein each of said pixels has a predetermined charge sweep-out time.

8. The optical head assembly of claim 7, wherein said predetermined charge sweep-out time is 200 nanoseconds.

9. An optical head assembly, comprising:

a light source for emitting at least one laser beam;

beam transmission apparatus for transmitting the laser beam from said light source and converging the laser beam on a recording medium;

at least one lens for forming an image with rays of light reflected from the recording medium;

a beam separator comprising first, second and third reflecting surfaces, said first reflecting surface being operable to divide most of the light intensity of the rays of reflected light, and said second and third reflecting surfaces being operable to divide the rays of reflected light that have passed through the first reflecting surface into substantially equal light beams that form images at different positions that do not lie in the same plane and are not on the same path;

a detector for detecting the amount of the first light component separated by said beam separator; and an image sensor disposed at a location substantially intermediate between said different positions at which said images of said substantially equal light beams are formed and along respective paths of travel of said substantially equal light beams for detecting respective amounts of said substantially equal light beams, said image sensor comprising an array of pixels operable to sequentially output an electric signal proportional to the amount of light received thereby;

wherein said array has at least 50 of said pixels.

10. The optical head assembly of claim 9, wherein said array has 50–1000 of said pixels.

11. The optical head assembly of claim 10, wherein said array has 50–150 of said pixels.

12. The optical head assembly of claim 11, wherein said array has 148 of said pixels and a charge sweep-out time of 30 microseconds.

* * * * *